United States Patent Office 3,563,959
Patented Feb. 16, 1971

3,563,959
PROCESS FOR THE PRODUCTION OF TRANS-
PARENT POLYAMIDES WHICH ARE RESIST-
ANT TO BOILING
Gerhard Schade, Witten-Bommern, Hermann Richtzen-
hain, Cologne-Sulz, Helmut A. de Fuenten, Mondorf,
and Franz Blaschke, Witten (Ruhr), Germany, assignors
to Dynamit Nobel Aktiengesellschaft, Troisdorf, Ger-
many
No Drawing. Continuation-in-part of application Ser. No.
685,720, June 26, 1967. This application Jan. 31, 1969,
Ser. No. 795,727
Claims priority, application Germany, June 25, 1966,
D 50,392
Int. Cl. C08g 20/00
U.S. Cl. 260—78                                 6 Claims

ABSTRACT OF THE DISCLOSURE

Transparent polyamides resistant to boiling are pro-
duced by reacting an aromatic dicarboxylic acid (or an
amide-forming derivative thereof) with a diamine having
the general formula:

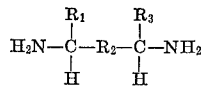

wherein $R_1$ is hydrogen or an alkyl group of 1 to 4 car-
bon atoms, $R_2$ is an alkylene group having 1 to 10 carbon
atoms in the chain or a phenylene group, and $R_3$ is an
alkyl group of 1 to 4 carbon atoms. About 1 to 25% by
weight of the reactants can be replaced by caprolactam.
The products are especially useful for making transparent
thin films.

This application is a continuation-in-part of copending
application Ser. No. 685,720, filed on June 26, 1967, now
abandoned.

BACKGROUND OF THE INVENTION

This invention relates to a process for the production
of polyamides. More particularly, it relates to a process
for the production of transparent polyamides resistant or
fast to boiling. Even more particularly, the invention re-
lates to a process for the production of transparent poly-
amides resistant to boiling prepared from diamines and
aromatic dicarboxylic acids or the amide-forming deriva-
tives thereof.

Amorphous polyamides of aromatic dicarboxylic acids,
specifically of terephthalic acid, are already known. They
have a glass-clear appearance which is not changed by
tempering for a long period of time at an elevated tem-
perature, exhibit softening temperatures of up to about
145° C., and represent materials which are distinguished
by great hardness and toughness. Consequently, they are
employed especially for the production of translucent,
clear, shaped articles, as well as films and foils. These con-
ventional polyamides are those where, in the manufacture
thereof, alkyl-substituted α,ω-diamines are employed, such
as, for example, 2-methyl-4-ethyl-hexamethylenediamine,
2,2,5,5 - tetramethylhexamethylenediamine, 3 - isopropyl-
hexamethylenediamine, 3-isooctylhexamethylenediamine,
3-isododecylhexamethylenediamine, 2,4-diethyloctamethyl-
enediamine, or also cyclic diamines, such as 3-amino-
methyl-3,5,5-trimethylcyclohexylamine.

The polyamides produced from aromatic dicarboxylic
acids and these diamines have the property in common
that they are readily attacked by a number of solvents
and exhibit an unsatisfactory stability especially against
boiling water. This aspect is of substantial disadvantage
in the use of such polyamides in various technical fields
of application, for example, in their employment as foils
or films for food packaging.

Although a process is known in the art which attempts
to eliminate this disadvantage by simultaneously employ-
ing proportions of unbranched α,ω-diamines during the
manufacture of such polyamides, this conventional meas-
ure merely effects an improvement, but does not provide
a stability with respect to boiling water sufficient for all
applications, which stability is especially deficient in the
case of shaped articles having a large specific surface,
such as thin films.

One of the objects of the present invention is to pro-
vide a process for the production of amorphous poly-
amides which overcomes the deficiencies and disadvantages
of the prior art.

Another object of the present invention is to provide
transparent polyamides having an excellent resistance to
boiling water.

A further object of the invention is to provide a proc-
ess for the preparation of polyamides which have excel-
lent mechanical properties and a desirable glass-clear
appearance.

A still further object of the invention is to provide a
process for the preparation of said polyamides which
may be carried out efficaciously and advantageously.

These and other objects and advantages of the present
invention will become apparent to those skilled in the art
from a consideration of the following specification and
claims.

SUMMARY OF THE INVENTION

In accordance with the present invention, it has been
surprisingly found that transparent polyamides resistant
to boiling may be produced from diamines and aromatic
dicarboxylic acids or the amide-forming derivatives
thereof as the starting material, if diamines having the
following formula are employed in the process:

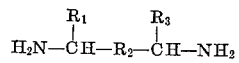

wherein $R_1$ is hydrogen or a lower alkyl group of 1 to
4 carbon atoms, $R_2$ is an unsubstituted or alkyl-substituted
alkylene group having 1 to 10 carbon atoms in the chain
or an unsubstituted or alkyl-substituted phenylene group,
and $R_3$ is an alkyl group of 1 to 4 carbon atoms.

The polyamides produced in accordance with the inven-
tion surprisingly possess, as compared to the conventional
polyamides of a similar structure, a substantially superior
stability against boiling water, as well as higher soften-
ing temperatures. Moreover, they exhibit, just like the
conventional polyamides, the desired transparent appear-
ance which does not change, even when heated for long
periods of time above the solidification or congealing tem-
perature, excellent hardness and good mechanical prop-
erties. Therefore, they are suitable for the production of
shaped articles of all types wherein special importance
is placed on the combination of these properties in
particular.

Polyamides have been produced in the prior art by the
condensation of terephthalic acid with α,ω-diamines con-
taining two methyl groups in the side chain. Examples of
the diamines employed in this connection are dimethyl-
hexamethylenediamine, dimethylheptamethylenediamine
and dimethyloctamethylenediamine. However, these poly-
condensates exhibit a tendency to crystallize, in contrast
to the polyamides produced in accordance with this in-
vention, particularly when being heated, and therefore are
opaque. Their field of application is in the art of high-
strength fibers and threads, for example, in the production
of tire cord.

These polyamides are normally based on branched

α,ω-diamines, the point or points of branching of which are located between the two carbon atoms carrying the amino groups. As a polyamide of an aromatic dicarboxylic acid and a diamine having an alkyl residue on the C-atom carrying the amino group, only that from terephthalic acid and 1,2-diaminopropane is known. In contrast thereto, longer-chain diamines wherein an alkyl residue is present on the C-atoms carrying the amino groups, such as 1,6-diaminooctane and 3,6-diaminooctane, have previously been condensed only with aliphatic dicarboxylic acids to form polyamides, which latter do not exhibit the above-described properties.

The diamines employable in accordance with this invention can be substituted by, respectively, one alkyl residue either on one or also on both carbon atoms carrying the amino groups. The carbon chain between the two amino groups can be of 3–12 carbon atoms. Examples of diamines which can be utilized in accordance with the invention are:

With a $C_3$-chain:
  1,3-diaminobutane
  1,3-diamino-2,4,4-trimethylpentane
  1,3-diamino-5-methyl-2-isopropyl-hexane
  3,5-diaminoheptane
With a $C_4$-chain:
  1,4-diaminopentane
  2,5-diamino-3,4-dimethyl-hexane
  3,6-diaminooctane
With a $C_5$-chain:
  1,5-diaminohexane
  1,5-diamino-4-methyl-hexane
  1,5-diamino-4-isopropyl-hexane
  2,6-diaminoheptane
  1,5-diamino-6,6-dimethyl-heptane
  2,6-diamino-3,3-dimethyl-heptane
  3,7-diaminononane
With a $C_6$-chain:
  1,6-diaminoheptane
  1,6-diamino-5-methyl-heptane
  1,6-diaminooctane
  2,7-diaminooctane
  2,7-diamino-4-methyloctane
  2,7-diamino-3,6-dimethyloctane
  2,7-diamino-3,3,5-trimethyloctane
  2,7-diamino-3,5,5-trimethyloctane
  3,8-diaminodecane
  5,10-diaminotetradecane
With a $C_7$-chain:
  1,7-diaminooctane
  1,7-diamino-4,4-dimethyloctane
  1,7-diamino-4,4-dimethyl-6-isopropyloctane
  1,7-diamino-4,4,6-trimethyloctane
  1,7-diamino-4,4,8-trimethylnonane
  1,7-diamino-4,4,9-trimethyldecane
  2,8-diaminononane
  2,8-diamino-5,5-dimethylnonane
  2,8-diamino-3,3,7,7-tetramethylnonane
  3,9-diaminoundecane
  3,9-diamino-4,4,8,8-tetramethylundecane
With a $C_8$-chain:
  2,9-diaminodecane
  2,9-diamino-3,3,8,8-tetramethyldecane
  3,10-diaminododecane
  3,10-diamino-4,4,9,9-tetramethyldodecane
With a $C_9$-chain:
  2,10-diaminoundecane
  3,11-diamino-4,4,10,10-tetramethyltridecane
With a $C_{10}$-chain: 2,11-diaminododecane
With a $C_{11}$-chain: 1,11-diaminododecane
With a $C_{12}$-chain: 2,13-diaminotetradecane.

The above list demonstrates that $R_1$ and $R_3$ can be unbranched, i.e., primary, as well as branched, i.e., secondary and tertiary, alkyl groups of 1–4 carbon atoms.

In addition to these aliphatic diamines, suitable diamines to be employed include those wherein $R_2$ is an arylene residue, unsubstituted or alkyl-substituted, to produce the polyamides of the present invention. Preferred compounds from the group of these diamines are α,α'-diamino-1,3-diethylbenzene and α,α'-diamino-1,4-diethylbenzene, which are obtainable from the corresponding diketones (by aminating hydrogenation).

The diamines mentioned herein represent merely examples, without there being an intention to limit the present invention to these diamines.

From the group of aromatic dicarboxylic acids, mononuclear or polynuclear acids are to be mentioned as suitable in the process of the present invention. For the manufacture of the polyamides of this invention, the preferred acids are the terephthalic and isophthalic acids, which are readily available technically. Nuclear-substituted derivatives thereof are also suitable, e.g., lower alkyl- and halo-substituted terephthalic and isophthalic acids. Also likewise usable are 4,4'-diphenyldicarboxylic acid or 4,4'-diphenyl - ether - dicarboxylic acid. In many cases, the use of mixtures of these acids is also advantageous. The term "amide-forming derivatives" is meant herein to include acid halides (for example, acyl chlorides and acyl bromides) or alkyl (preferably lower alkyl) or aryl (preferably phenyl) esters.

The manufacture of the polyamides according to the invention can basically be conducted in accordance with all processes customary for the production of conventional polyamides containing dicarboxylic acid residues and diamine residues. Thus, it is possible, for example, to polycondense the aqueous concentrated solution of the salt of aromatic dicarboxylic acid and diamine first under pressure and then under expansion (reduced pressure) at temperatures of up to about 280° C. in the melt, or to conduct the same process without previously isolating the salt after dissolving practically equimolar amounts of the aromatic dicarboxylic acid and of the diamine in hot water. Furthermore, the pressure stage can be circumvented by a preliminary condensation of the salt in high-boiling solvents, for example, in cresols, and a vacuum can be applied in the last stage of the polycondensation step.

It is likewise possible to react lower alkyl esters of the aromatic dicarboxylic acid with practically equimolar amounts of the diamine in the presence of water, with alcohol being split off, and the reaction product can be polycondensed like an aqueous salt solution. Instead of lower alkyl esters, the starting materials can also be diaryl esters of aromatic dicarboxylic acids, and in this case the concomitant use of water can be omitted. Finally, it is also possible to react dihalogenides of aromatic dicarboxylic acids at normal (room) temperature with equimolar quantities of the diamine in the presence of basic-acting compounds in accordance with the method of solution condensation or the process of interface condensation. Such processes, also known to comprise various modifications and combinations with one another, pertain to the state of the art and are intended herein when the expression is employed that the manufacture can be conducted "in accordance with conventional processes."

EXAMPLES OF THE INVENTION

The following examples are givent merely as illustrative of the present invention and are not to be considered as limiting.

Example 1

16.6 g. of terephthalic acid was made into a slurry with 25 ml. of a methanol-water mixture (per 1 part by volume); 17.2 g. of 4,4-dimethyl-1,7-diaminooctane was added thereto, and the mixture was heated to the boiling point and an additional amount of methanol-water mixture was added dropwise until a clear solution was obtained. The latter was cooled, 100 ml. of benzene was added, and the reaction solution was stirred for 30 minutes at 5° C. and filtered. The thus-obtained salt was washed with cold benzene and dried under a vacuum at 50° C. The yield was 31 g., corresponding to a theoretical yield of 91.6%.

20 g. of this salt was introduced in the molten phase together with 10 g. of boiled-out distilled water into a bomb tube under an atmosphere of pure nitrogen; the tube was placed into an autoclave partially filled with water so that the tube was sealed off airtight, and the autoclave and contents were heated for 2½ hours under the steam pressure which formed to 225° C. for 3 hours. After cooling, the bomb tube was withdrawn from the autoclave, opened, and the mixture of preliminary condensate and water contained therein was introduced into a distillation flask equipped with a stirrer. After purging the flask several times with extremely pure nitrogen, the temperature was increased during the course of 3 hours to 270° C., and maintained for 2 hours at this value, the melt becoming increasingly viscous. Thereafter, a vacuum of about 10 torr (mm. Hg) was applied for 30 minutes. The highly viscous melt solidified upon cooling to a transparent, colorless mass, the Vicat value of which was 169° C. The relative viscosity of a 1% by weight solution in sulfuric acid, determined at 25° C. in a capillary viscosimeter, amounted to 2.3.

The polymer was shaped by means of a hydraulic press into a foil of a thickness of about 0.2 mm. A polyamide produced in accordance with Example 1 from 16.6 g. of terephthalic acid, 14.2 g. of a mixture of 3,5,5- and 3,3,5-trimethylhexamethylenediamine and 2.6 g. of hexamethylenediamine was subjected to the same shaping step. Both films were placed into boiling water; after boiling for several hours, the sample produced in accordance with this invention did not exhibit any changes, whereas the comparative specimen, after about 20 minutes, exhibited cloudy or hazy portions and, after a boiling period of 1 hour, was permeated by bubbles and conglutinated. When boiled with ethanol, the specimen produced according to this invention became hazy, but retained its original shape, whereas the comparative specimen was partially dissolved and partially sintered together into a glutinous mass.

Example 2

75 g. of dimethyl terephthalate, 68 g. of 4,4-dimethyl-1,7-diaminooctane and 112 ml. of distilled water were heated, in a stirrer-equipped flask having a packed column attached thereon, for 7 hours in such a manner that the vapor temperature at the head of the column was 64–66° C., after which time 28 ml. of methanol had been distilled off. Then, 70 ml. of water was additionally distilled off, and the contents of the flask were transferred into an agitated autoclave under a nitrogen atmosphere. The autoclave was heated to 230° C. within 2 hours, and then brought to 270° C. within a further hour and expanded during the latter stage to normal pressure. After another 2 hours, a vacuum of 10 torr was applied for 30 minutes.

The material was then withdrawn under pressure by means of nitrogen through a bottom valve, and it solidified to a transparent, translucent mass, the Vicat value of which was 168° C. and the relative viscosity of which was 2.4 in accordance with the example. The material was stored for 24 hours at 140°, 150°, 160° and 165° C., respectively. In no instance could manifestations of an onset of crystallization be detected.

Examples 3–11

In accordance with the procedure of Examples 1 and 2, additional polyamides were produced, the starting materials being varied. The compounds employed and the properties of the thus-obtained products are shown in Table 1:

TABLE 1

| Ex. | Amine | Acid | Method of production | Reduced viscosity | Appearance of film approx. 0.2 mm. | Boiling fastness, min. |
|---|---|---|---|---|---|---|
| 3 | 1,3-diaminobutane | Terephthalic acid | Amine plus acid | 2.0 | Transparent | >30 |
| 4 | 3,5-diaminoheptane | do | do | 2.2 | do | >30 |
| 5 | 2,5-diamino-3,4-dimethylhexane | do | Amine plus dimethyl terephthalate. | 2.0 | do | >30 |
| 6 | 3,8-diaminodecane | 50% terephthalic plus 50% isophthalic acid | Amine plus acid | 2.2 | do | >30 |
| 7 | 1,7-diamino-4,4,6-trimethyloctane. | 75% terephthalic plus 25% 4,4'-diphenyl-dicarboxylic acid. | do | 2.3 | do | >30 |
| 8 | do | Terephthalic acid | Amine plus diphenyl terephthalate. | 2.2 | do | >30 |
| 9 | 1,7-diamino-4,4,8-trimethylnonane. | 75% isophthalic plus 25% 4,4'-diphenyl-ether-dicarboxylic acid. | Amine plus acid | 2.1 | do | >30 |
| 10 | α,α'-Diamino-1,3-diethylbenzene. | Terephthalic acid | do | 1.9 | do | >30 |
| 11 | α,α'-Diamino-1,4-diethylbenzene | do | do | 2.0 | do | >30 |

Example 12

24.9 g. of terephthalic acid and 28.8 g. of 1,7-diamino-4,4,6-trimethyloctane were boiled under reflux with 100 ml. of freshly distilled cresol (mixture of isomers) for 5 hours, and then the cresol and the water of reaction were distilled off by way of an ascending cooler. During this process, the temperature of the melt was increased within 60 minutes to 270° C. Thereafter, a vacuum of 0.1–0.2 torr was applied, and under these conditions the melt was agitated for another 4 hours. The highly viscous melt solidified to a clear mass, the Vicat value of which was determined to be 164° C. and a glass conversion (vitrification) point of which was found to be 163° C. (by means of differential thermal analysis). The relative viscosity of a 1% by weight sulfuric acid solution was 2.1. A pressed foil did not start to become cloudy until it was boiled in water for 2 hours.

Example 13

Example 12 was repeated, but with the difference that, in place of terephthalic acid, the same amount of isophthalic acid was employed. The final product had a Vicat value of 162° C., a vitrification temperature likewise of 162° C. and a relative viscosity of 2.0 in sulfuric acid. A pressed foil could be boiled for 2½ hours without any change in its appearance.

Example 14

In a 100 ml., stirrer-equipped flask, 31.8 g. of diphenyl terephthalate (0.1 mole) and 18.79 g. of 4,4,6,7-tetramethylheptamethylenediamine (0.101 mole) were heated under an atmosphere of pure nitrogen. After the mixture was melted, the mixture was slowly stirred and condensed in accordance with the following temperature scheme:

1 hour at 180° C.
15 minutes at 230° C.
30 minutes at 250° C.
20 minutes at 280° C.
1 hour at 280° C. and 0.3 mm. Hg The split-off phenol was gradually distilled off during this process, and the melt became increasingly more viscous until finally it could hardly be moved any more. After cooling, a weakly yellowish completely transparent condensate was obtained. The relative viscosity thereof was 1.97.

A piece of foil pressed therefrom and having a thickness of about 0.5 mm. was subjected to a test in boiling water for 6 hours. The foil remained completely clear and did not exhibit any effects with respect to its flexibility.

By means of the differential thermal analysis method, the solidification (congealing) temperature was determined to be 160° C. The beginning of a decomposition was observed starting at 435° C.

Example 15

8.6 g. of 1,6-diethylhexamethylenediamine (0.05 mole) was dissolved, in an alkaline solution of 4 g. of NaOH (0.1 mole), in 2.5 liters of water. Under vigorous agitation, at room temperature, a solution of 10.15 g. of terephthaloyl chloride (0.05 mole) in 1 liter of methylene chloride was allowed to flow into the above solution within 3 minutes. The reaction mixture was stirred at room temperature for 15 minutes. The thus-formed polyamide was precipitated as a powder. It was vacuum-filtered, washed neutral with water and dried under a vacuum at 90° C. for 12 hours. The yield of product was 14 g. It had a relative viscosity of 1.96.

From the powder, a small plate was pressed at 290° C. A completely transparent shaped piece of polyamide was obtained which will still without any haze after being boiled in water for 6 hours.

By means of the differential thermal analysis method (DTA), the solidification (congealing) temperature was determined to be 160° C.; the onset of decomposition was observed starting at 415° C.

Example 16

As described in Example 14, 11.6 g. of 1-methylpentamethylenediamine (0.1 mole) was condensed in the melt with 31.8 g. of diphenyl isophthalate. A completely transparent polyamide having a yellowish discoloration was obtained having a relative viscosity of 2.37.

By means of DTA, the congealing (solidification) temperature was determined to be 124° C.; the onset of decomposition was observed starting at 390° C.

A further advantageous aspect of the present invention is that it is possible to obtain polyamides having advantageous properties by substituting about 1–25% by weight, based on the amount of dicarboxylic acid and diamine or the amide-forming derivatives thereof, of caprolactam as a reactant. By the concomitant use of caprolactam, it is possible to produce economically amorphous polyamides substantially resistant against boiling water. Furthermore, due to the simultaneous utilization of caprolactam, the melt viscosity of the polycondensates is lowered (the prerequisites being the same temperature and the same average molecular weight), whereby higher degrees of polycondensation of the caprolactam-modified polyamides are obtainable, with the use of the conventional melt-condensation processes. Although the concomitant use of caprolactam also lowers the softening temperature of the polyamides and increases the water-adsorption capability of these compounds, these values are without special significance in certain applications, for example, when the polyamides are used as foils or films resistant to boiling.

Considering the higher water-absorbing capability of the polyamides produced in accordance with this invention, which capability effects a distinct softening activity, it is furthermore surprising, and could not be foreseen, either, that these polyamides do not become hazy, blistered, or permeated by bubbles when boiled in water, or when the moisture-saturated specimens are subsequently cooled, or during the drying process which follows.

For the condensation step, the caprolactam is suitably employed in the customary fiber qualities. Polymers produced in accordance with this embodiment of the invention are described in the examples below and were characterized in accordance with specific data, obtained as follows:

The "relative viscosity" is the ratio of flow time of 100 ml. of solution containing 1 g. of polymer to that of the pure solvent, determined in a capillary viscosimeter at 25° C. The solvent employed was concentrated sulfuric acid (d.=1.84).

The Vicat value was determined in accordance with the VDE Standard 0302/III. 43 in air.

The softening point was indicated by means of a penetrometer as that temperature at which a needle of a cross-sectional area of 1 mm.² under a total load of 350 g. penetrates to a depth of 0.1 mm. into a test specimen provided with plane-parallel contact surfaces. The test specimen was in a paraffin oil bath, the temperature of which was increased by 1° C. per minute.

Accordingly, the process of this invention is further illustrated by the following examples:

Example 17

45 parts by weight of the salt of terephthalic acid and 4,4-dimethyl-1,7-diaminooctane, 5 parts by weight of caprolactam and 100 parts by weight of cresol were agitated, under an atmosphere of pure nitrogen, for 3 hours at 190° C., for 2 hours at 240° C. and for 2 hours at 270° C. During this process, the water formed during the reaction was distilled off together with the cresol. Thereafter, a vacuum of 1–0.1 torr was applied for another 3 hours at 270° C. A clear resin of weakly yellowish color was produced having the following characteristic data:

Relative viscosity: 2.24
Vicat value: 152° C.

After boiling in water for 5 hours, no visible changes had occurred; the Vicat value decreased, due to water absorption, to 147° C. and rose again to the initial value of 152° C. after drying to constant weight at 110° C.

The softening point of the specimen boiled in water, determined by a penetrometer, was 131° C.

The dry polymer was shaped by means of a hydraulic press into a foil having a thickness of 0.2 mm. This foil remained unchanged in shape and appearance even after being boiled in distilled water for 10 hours. The water did not leave any residues whatever after being evaporated.

Example 18

100 g. of dimethyl terephthalate, 90 g. of 4,4-dimethyl-1,7-diaminooctane and 35 g. of caprolactam (corresponding to 20% by weight of the total amount of diamine and terephthalic acid) were agitated for 5 hours at 95–100° C. During this process, methanol was evaporated. The clear solution was concentrated by evaporation at normal pressure until indication of an onset of hazing were observed. The mass was then transferred into an autoclave, flushed out several times by nitrogen under pressure, and heated under the vapor pressure which became ambient for 2 hours to 230° C., brought to 270° C. within another hour, and expanded during the latter stage to normal pressure. After another 2 hours at 270° C., a vacuum of 10 torr was applied for 30 minutes, and then the melt was pressed (pumped) out through a bottom valve.

The clear, transparent mass had a relative viscosity of 2.35 and a Vicat value of 148° C., which latter was reduced to 138° C. after boiling in water for 5 hours. The softening point, as determined by a penetrometer, of a specimen saturated with water was 112° C.

A film of a thickness of 0.2 mm. was boiled for 10 hours in distilled water, there being no visible change in the nature of the material.

Example 19

The process of Example 18 was conducted, with the difference that, in place of 100 g. of dimethyl terephthalate, a mixture of 50 g. of dimethyl terephthalate and 50 g. of dimethyl isophthalate was employed. The thus-obtained product exhibited a relative viscosity of 2.30. The other properties corresponded, within the limits of error of ±2° C., to those of the product obtained in accordance with Example 18.

Example 20

Example 18 was repeated, with the difference that, in place of 35 g. of caprolactam, 43 g. of caprolactam was employed, corresponding to 25% by weight, based on the total amount of diamine and the amount of terephthalic acid equivalent to dimethyl terephthalate. The thus-produced polyamide had the following properties:

Relative viscosity: 2.38
Vicat value: 145° C.; after saturation with water: 135° C.
Softening point after saturation with water: 103° C.

A film of a thickness of 0.2 mm. produced therefrom remained externally unchanged after being boiled in water for 10 hours. Larger percentages of caprolactam resulted in products which, after being shaped into foils, adhered to the walls of the vessel during boiling and became increasingly hazy after 2–5 hours.

The invention being thus described, it will be obvious that the same may be varied in many ways. Such variations are not to be regarded as a departure from the spirit and scope of the invention, and all such modifications as would be obvious to one skilled in the art are intended to be included.

We claim:

1. A polyamide resistant to boiling water consisting essentially of a solid polymeric condensation product of a compound selected from the group consisting of carbocyclic aromatic dicarboxylic acids, acid halides thereof and alkyl or aryl esters thereof with a diamine having the formula:

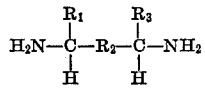

wherein $R_1$ is hydrogen or any alkyl group of 1 to 4 carbon atoms, $R_2$ is an alkylene group having 1 to 10 carbon atoms in the chain or a phenylene group, and $R_3$ is an alkyl group of 1 to 4 carbon atoms.

2. A polyamide in accordance with claim 1, wherein about 1 to 25% of the reactants is replaced by caprolactam.

3. A polyamide in accordance with claim 1, wherein said compound is terephthalic or isophthalic acid.

4. A polyamide in accordance with claim 2, wherein said compound is terephthalic or isophthalic acid.

5. A polyamide according to claim 1, wherein the diamine is selected from the group consisting of 4,4-dimethyl - 1,7 - diaminooctane, 1,3-diaminobutane, 3,5-diaminoheptane, 2,5-diamino - 3,4 - dimethylhexane, 3,8-diaminodecane, 1,7-diamino - 4,4,6 - trimethyloctane, 1,7-diamino - 4,4,8 - trimethylnonane, α,α′-diamino-1,3-diethylbenzene, α,α′-diamino - 1,4 - diethylbenzene, 4,4,6,7-tetramethylheptamethylenediamine, 1,6 - diethylhexamethylenediamine, 1-methylpentamethylenediamine.

6. A polyamide according to claim 2, wherein the diamine is 4,4-dimethyl-1,7-diaminooctane.

References Cited

UNITED STATES PATENTS

| | | | |
|---|---|---|---|
| 2,130,948 | 9/1938 | Carothers | 260—78 |
| 2,252,555 | 8/1941 | Carothers | 260—78 |
| 2,640,082 | 5/1953 | Schreyer | 260—78 |
| 2,752,328 | 6/1956 | Magat | 260—78 |
| 2,766,222 | 10/1956 | Lum et al. | 260—78 |
| 2,864,807 | 12/1958 | Nobis et al. | 260—78 |
| 3,145,193 | 8/1964 | Gabler | 260—78 |
| 3,150,113 | 9/1964 | Gabler | 260—78 |
| 3,150,117 | 9/1964 | Gabler | 260—78 |
| 3,198,771 | 8/1965 | Gabler | 260—78 |
| 3,294,758 | 12/1966 | Gabler | 260—78 |

HAROLD D. ANDERSON, Primary Examiner

U.S. Cl. X.R.

260—30.8, 47